US007066658B2

(12) United States Patent
Lane

(10) Patent No.: US 7,066,658 B2
(45) Date of Patent: Jun. 27, 2006

(54) METHOD OF SECURING AN OPTICAL FIBRE TO AN ELECTRONIC PACKAGE

(75) Inventor: Anthony Alan Lane, Northants (GB)

(73) Assignee: Bookham Technology, plc, Towcester (GB)

( * ) Notice: Subject to any disclaimer, the term of this patent is extended or adjusted under 35 U.S.C. 154(b) by 246 days.

(21) Appl. No.: 10/416,994

(22) PCT Filed: Nov. 16, 2001

(86) PCT No.: PCT/GB01/05073

§ 371 (c)(1),
(2), (4) Date: Oct. 16, 2003

(87) PCT Pub. No.: WO02/41052

PCT Pub. Date: May 23, 2002

(65) Prior Publication Data

US 2004/0052479 A1    Mar. 18, 2004

(30) Foreign Application Priority Data

Nov. 16, 2000  (GB) .............................. 0028062.8

(51) Int. Cl.
*G02B 6/36* (2006.01)
*G02B 6/00* (2006.01)
(52) U.S. Cl. ........................... 385/92; 385/91; 385/139
(58) Field of Classification Search ................. 385/88, 385/91, 92, 139
See application file for complete search history.

(56) References Cited

U.S. PATENT DOCUMENTS

| 4,892,381 A | 1/1990 | Glasheen ................. 350/96.22 |
| 4,921,322 A | 5/1990 | Seike et al. .................. 385/138 |
| 5,631,991 A | 5/1997 | Cohen et al. .................. 385/93 |
| 5,658,364 A | 8/1997 | DeVore et al. ................. 65/431 |
| 5,872,881 A | 2/1999 | Rossi et al. .................... 385/92 |
| 6,392,210 B1* | 5/2002 | Jewett et al. ................ 219/663 |
| 6,431,766 B1* | 8/2002 | Randle ......................... 385/92 |
| 6,901,203 B1* | 5/2005 | Czubarow et al. .......... 385/138 |
| 2004/0240804 A1* | 12/2004 | Mahapatra et al. ........... 385/94 |

FOREIGN PATENT DOCUMENTS

| EP | 0339791 B1 | 11/1989 |
| EP | 0450299 B1 | 10/1991 |
| EP | 0635737 A1 | 1/1995 |
| JP | 62 065003 A | 3/1987 |

* cited by examiner

*Primary Examiner*—Akm Enayet Ullah
*Assistant Examiner*—Daniel Petkovsek
(74) *Attorney, Agent, or Firm*—Lahive & Cockfield, LLP; Anthony A. Laurentano, Esq.

(57) ABSTRACT

An optical fibre is secured to an electronic package (10) by, firstly, providing in a wall (14) of the package (10) an electrically conductive tube (12), an inductance arrangement (16–22) in magnetically co-operational relation to the tube (12) and a securing agent inside the tube, then secondly inserting the fibre into the tube (12) and passing an RF current through the inductance arrangement (16). The current is such as to melt the securing agent and, when the securing agent is allowed to cool, a bond is formed between the fibre and the tube (12). The package (10) is preferably an LTCC mulilayer package with the inductance (16) being formed in adjacent layers and the tube (12) is preferably composed of a metallic ink which is applied to a stepwise-circular cylindrical cavity likewise formed in adjacent layers.

20 Claims, 3 Drawing Sheets

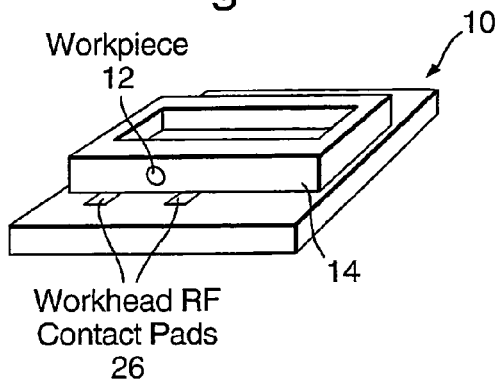
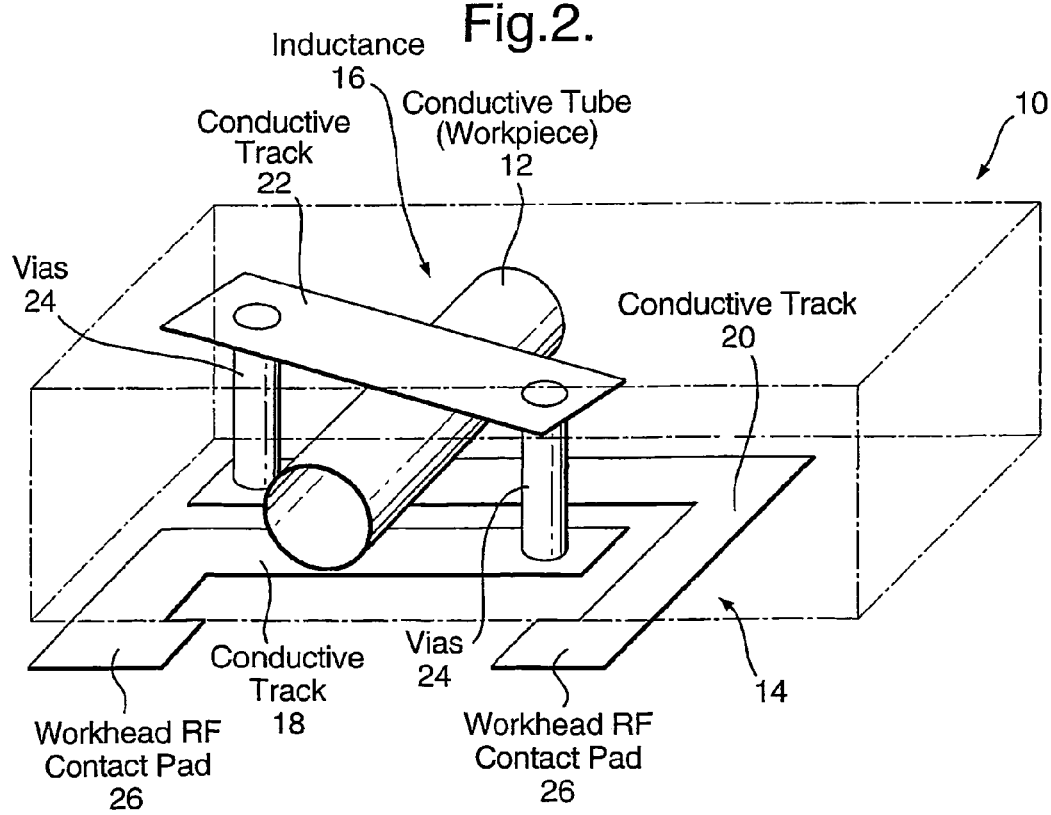

US 7,066,658 B2

METHOD OF SECURING AN OPTICAL FIBRE TO AN ELECTRONIC PACKAGE

RELATED APPLICATIONS

This application is a 35 U.S.C. 371 national stage filing of International Application No. PCT/GB01/05073, filed 16 Nov. 2001, which claims priority to Great Britain Patent Application No. 0028062.8, filed on 16 Nov. 2000 in Great Britain. The contents of the aforementioned applications are hereby incorporated by reference.

BACKGROUND OF THE INVENTION

The invention relates to a method of securing an optical fibre to an electronic package and in particular, but not exclusively, a low-temperature co-fired ceramic electronic package, and to an optical fibre termination arrangement produced by such a method. The invention also relates to the bonding of a glass member to a metal seal.

Various methods for joining optical fibres to electronic packages are known, one method being to use a tube into which a metallised fibre is sealed. This tube is then soldered or laser-welded into a second tube that protrudes into the package. The soldering operation is carried out using a modified soldering iron with solder being fed into the heated tube while the optical fibre is aligned with a receiver diode in association with which the fibre is to work.

There are several drawbacks with this soldering method. These are:

A significant amount of room needs to be left in the package for soldering-iron access.

The tube takes time to heat up due to the thermal conductivity of the package.

There is a risk of damaging internal on-board components due to the heat of the iron.

A high level of manual skill is required to properly manipulate the hot iron within the package.

The method is currently limited to the use of metal packages.

Due to the use of two tubes, there are two joints from which leaking can occur.

It can be difficult to achieve hermetic seals.

The tube tends to heat up unevenly.

SUMMARY OF THE INVENTION

In accordance with the invention there is provided a method of securing an optical fibre to an electronic package, comprising: providing in a wall of the package a hollow, electrically and thermally conductive receiving element for receiving the fibre; providing in juxtaposition to the receiving element in one or more metallisation layers of the package an inductance arrangement; providing a fibre-securing agent inside the receiving element; inserting the fibre into the receiving element, applying an RF current to the inductance arrangement and allowing the receiving element and thereby the securing agent to heat up due to the RF current, the securing agent being softened thereby, thereafter allowing the securing agent to cool and harden such that the fibre is secured inside the receiving element.

Preferably the fibre is metallised and the fibre-securing agent is a solder.

The solder can be provided in the form of a wire which is introduced into a space between the receiving element and the fibre.

Alternatively the solder is provided in the form of a tubular preform of solder which is applied around the metallised fibre prior to insertion of the fibre into the receiving element.

In a further alternative arrangement the solder is provided in the form of rings of solder disposed on the inner and outer surfaces of a metallic wettable tube disposed between the receiving element and the fibre, the solder rings melting during application of a heating current to the inductance arrangement and thereby joining the fibre to the receiving element.

In yet a further arrangement the solder is provided in the form of a coating of a solder material on the outside of the metallised fibre and on the inside of the receiving element. Advantageously the solder coating is such as to allow a fluxless soldering process to take place and is preferably a diffusion-type multilayer coating.

As an alternative to solder the securing agent can comprise a thermosetting adhesive.

Preferably the receiving element is a cylindrical element. Advantageously the receiving element is composed of a metallic ink.

When the package is a multilayer package, the receiving element is advantageously formed by, in an unfired state of the package: (a) the provision of a stepped series of openings in adjacent layers of the package, the stepped series of openings being such as to form an approximation to a circular cylindrical cavity lying within the package and running substantially parallel to the orientation of the layers of the package, and (b) the application of the metallic ink to the walls of the cavity. Preferably when the package is fired, the ink flows such as to form a substantially circular cylindrical receiving element.

Advantageously an electrical screen is provided to shield circuitry, which is disposed on the package, from the RF heating current. The screen can be in the form of a metal clamp which is used to align the fibre with a circuit component disposed on the package. Alternatively the screen is in the form of a metallisation layer provided on the package and at least partially surrounding the circuitry.

The method of the present invention finds particular application when the package is a low-temperature cofired ceramic package. Preferably the electronic package comprises an optical fibre termination arrangement in which the termination of the fibre has been achieved through the above method.

According to a second aspect of the invention there is provided use of an RF induction heating process to secure an optical fibre to an electronic package.

According to a further aspect of the invention there is provided use of an RF induction heating process to bond a glass member to a metal seal.

BRIEF DESCRIPTION OF THE DRAWINGS

Embodiments of the invention will now be described, by way of example only, with reference to the drawings, of which:

FIG. 1 is a general view of an electronic package showing the positioning of components of an optical fibre terminating arrangement in accordance with the present invention;

FIG. 2 shows the same arrangement, but incorporating hidden details of components of the embodiment of FIG. 1;

DESCRIPTION OF ILLUSTRATE EMBODIMENT

Figure 3A:
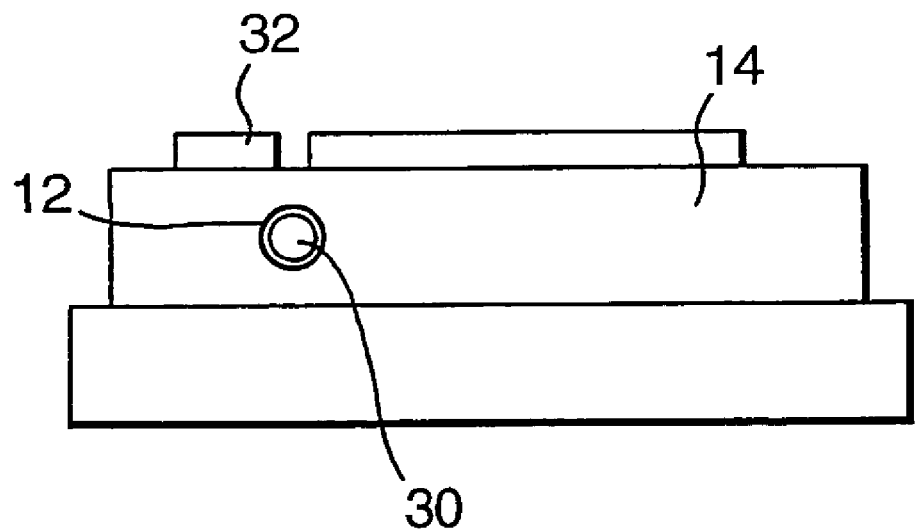
FIGS. 3(a) and 3(b) are front and side views, respectively, of a fibre-terminating arrangement according to the invention and showing the provision of a metal screen for protecting on-board circuitry.

Referring to FIGS. 1 and 2 there is shown an optical fibre-terminating arrangement according to the invention, in which a cylindrical, electrically and thermally conductive tube 12 is provided in a wall 14 of an electronic package 10. The preferred composition of the tube 12 will be described later. Disposed in magnetically co-operative relationship with the tube 12 is an inductance 16 formed from winding sections 18, 20 and 22. The sections are formed in two metallisation layers of the package 10 with interconnections between the layers being by way of vias 24. As shown, the winding sections are connected in series with the whole series arrangement being terminated in a couple of contact pads 26. The inner wall of the tube 12 is provided with a fibre-securing agent, e.g. solder.

In use, an optical fibre (not shown) is introduced into the tube 12 within the securing agent and an RF current is fed into the contact pads 26. Due to the configuration of the inductance winding sections 18, 20, 22 a transformer action is initiated in which the inductance itself acts as the primary and the tube 12 acts as a short-circuited secondary. The result is the generation of eddy currents in the tube 12 (secondary) and consequent heating thereof. If the temperature of the tube reaches a sufficient level (e.g. around 200° C. in a case involving solder), the securing agent (solder) will melt and will fuse the fibre to the tube once subsequent cooling of the securing agent takes place. Thus the fibre is secured to the package. The heating technique used is commonly known as the RF induction-heating method, with the inductive coil 16 acting as the so-called "workhead" and the tube 12 fulfilling the role of the "workpiece".

The tube 12 will provide optimum coupling of power if it is of a ferrous material such as Kovar™ or Invar™.

The energy coupled into the tube heats up the tube evenly along its entire length so that there is an even flow of the securing agent between the fibre and the tube. This allows a cylindrical securing joint to be realised along the entire length of the tube, which leads to an optimum securing action. In addition, when the securing agent is a solder and the solder solidifies following application of the RF current, axial stresses are created within the solder joint which mitigates problems associated with solder creep.

Where the fibre is required to be hermetically secured to the package, the fibre-securing agent is preferably a solder. In this case the fibre will be initially provided with a metallised layer to facilitate bonding between the fibre and the tube 12. Also to facilitate bonding, the tube is preferably pre-tinned or plated with a wettable metal such as, e.g., gold, silver or copper. Due to the likelihood of oxidation problems, gold or silver are the preferred materials.

There are several methods whereby solder or brazing material may be introduced into the tube. Firstly, the solder may be in the form of a wire which is hand-fed into the space between the tube and the metallised fibre. Secondly, both the inner wall of the tube 12 and fibre metallisation may be coated with solder so that, on heating, the melted solder layers flow together. Thirdly, a tubular preform of solder may be placed around the metallised fibre prior to insertion of the fibre into the tube 12. RF heating action will then melt this preform of solder and accomplish bonding of the fibre to the tube. Fourthly, a metallic, wettable tube having integral rings of solder both on its inner and outer surfaces may be initially inserted into the tube 12. On heating, the inner rings melt and join to the fibre, while the outer rings melt and join to the tube 12.

In place of solder, it is also possible to employ a thermosetting adhesive as the fibre-securing agent, such adhesive being likewise made to melt by RF heating action and allowed to set. However, in this case the joint produced may not be hermetic.

Figure 3B:
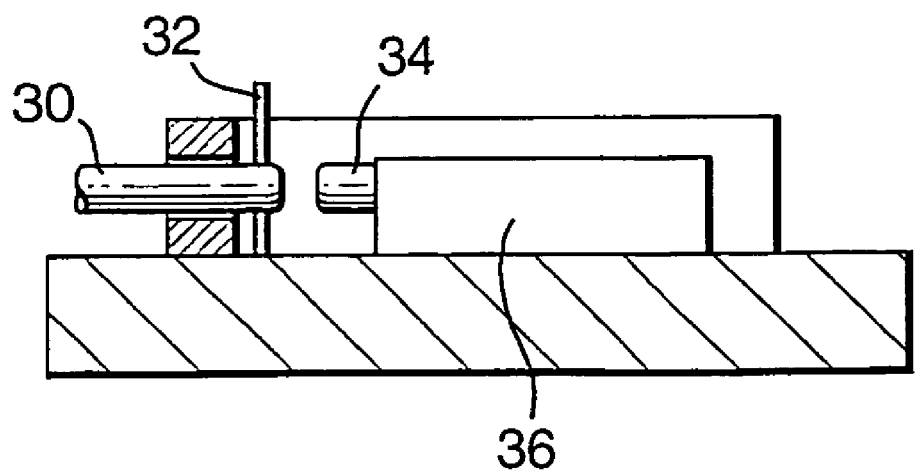

In order to prevent RF radiation from interfering with electronic circuitry on the package it may be necessary to insert a metallic screen between the coil 16 and such circuitry. One way of accomplishing this is to arrange for the fibre-end to engage with a small metallic fork attached to the package in the area of the wall in which the tube 12 is provided. The principle of this is shown in FIGS. 3(a) and 3(b). FIG. 3(a) shows a front view of the package 10 in which the fibre 30 is inserted into the tube 12 provided in a package wall 14 and a fork-like structure 32 is provided on the rear side of the wall 14. The "prongs" of the fork 32 grip the end of the fibre 30 and simultaneously perform (a) an aligning function bringing the end of the fibre into alignment with a co-operating element 34 (a diode or modulator) forming part of the electronic circuitry 36 on board the package, and (b) a screening function shielding the circuitry 36 from the RF radiation emanating from the inductance 16.

Figure 4:
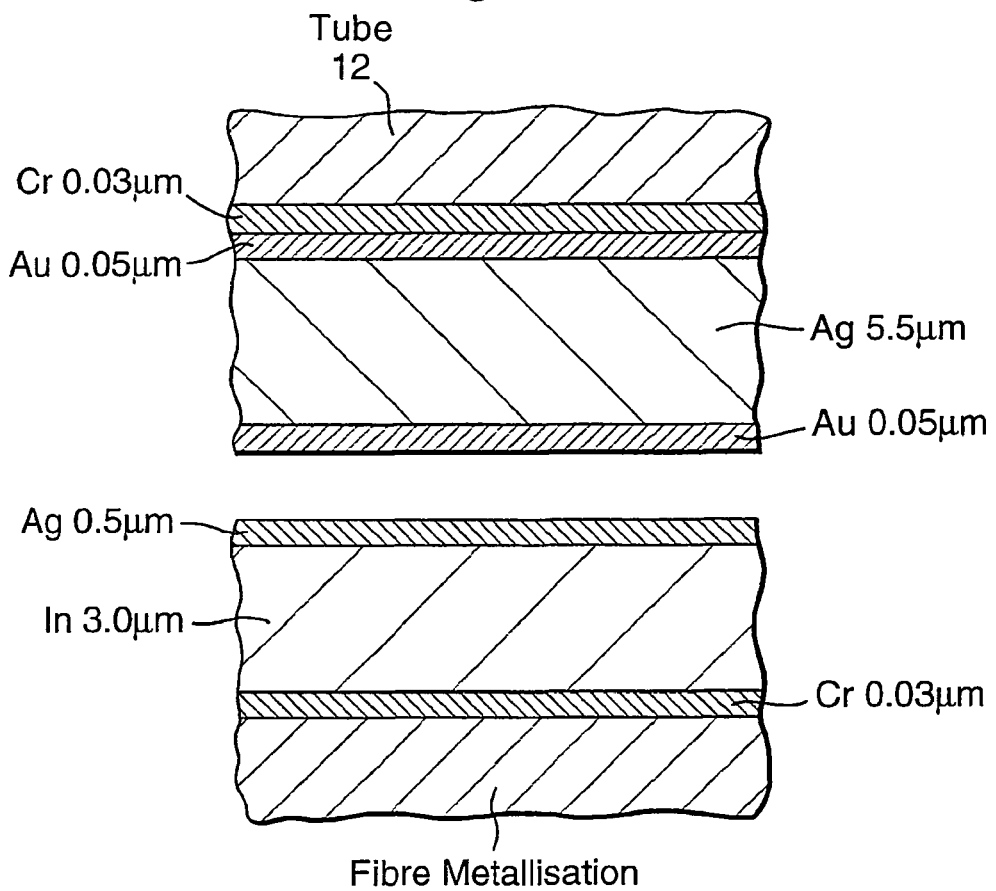
FIG. 4 shows in cross-section a diffusion-solder arrangement employed as a fibre-securing agent in the fibre-terminating arrangement according to the present invention.

As an alternative form of shielding, the inner surface of the wall 14 facing the circuitry 36 may be metallised by the application of a metal layer specifically for that purpose.

Where solder is employed as the fibre-securing agent, some creep of the solder may occur during service. This is where, during normal operation, temperature cycling causes a relaxation of the lattice structure of the solder. As a result the fibre could move out of alignment after a while. One solution to this is to use a diffusion-soldering technique, in which a multilayer sandwich of metals is applied to both the inner surface of the tube 12 and to the outer metallisation of the fibre and the two multilayer structures heated to over 200° C. One possible composition of such a diffusion-based solder is shown in FIG. 4. In FIG. 4 the tube 12 has applied to its inner surface first a layer of chromium, then a layer of gold followed by a silver layer and finally a further gold layer. The outer surface of the metallisation present on the fibre has a 3-layer structure consisting of, firstly, a chromium layer, then an indium layer and finally a silver layer. Possible layer thicknesses are as given on the diagram. It is to be understood that the relative disposition of the four-layer and three-layer solder structures on the tube and fibre, respectively, could be reversed.

Apart from the inhibition of creep, a further benefit of this method of soldering is the elimination of any need for a fluxing step with its concomitant and subsequent cleaning process, which may involve the use of CFC solvents.

Figure 5:
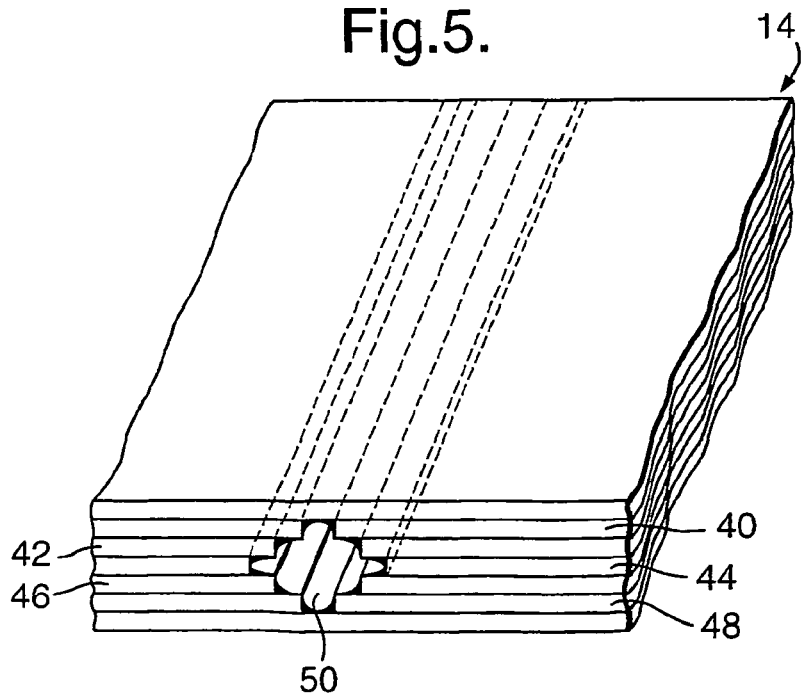
FIG. 5 illustrates one way of providing a metallic tube for receiving the optical fibre in a fibre-terminating arrangement according to the invention.

A preferred way of producing the tube "workpiece" 12 will now be described. A package substrate, which is preferably composed of a low-temperature co-fired ceramic (LTCC), having at least, say, five layers is provided (see FIG. 5). The various layers are provided with cut-outs, or channels, extending through the package wall 14. The outermost layers 40, 48 have a narrow cut-out, the next layers 42, 46 going inwards have a broader cut-out, while the central layer 44 has the widest cut-out of all. Such a formation results in a channel in the wall 14 which is a step-wise approximation to a circular cylinder. The cut-outs are made in the various layers while the LTCC substrate is in its "green" (unfired) state by mechanically punching each layer. Also while in the green state, a metallic ink is applied to the "cylindrical" surface formed from the cut-outs. When the substrate is fired (at, e.g., 800° C.), the various layers are bonded together and the ink flows and, due to the inherent meniscus formation, assumes a more nearly ideal circular cross-section than the stepwise approximation provided by the initial cut-outs. The ink in this condition is illustrated as reference numeral 50. The resulting substantially circular cross-sectional cylinder then constitutes the tube 12.

The use of an LTCC package is particularly advantageous in this aspect of the invention, since all the layers of the substrate can be worked, and the metallic ink applied, before firing.

In summary, the advantages of the above described embodiment of the present invention over prior techniques for fixing optical fibres to packages are:

Heating is produced in the required area in seconds.
Heating is confined to the desired area.
Where the RF current is applied using, for example, a foot pedal, both hands will be free to correctly align the fibre in the tube.
Only low levels of operator skill are required, leading to higher yields.
Very low cost LTCC packages can be utilised, leading to reduced package size and reduce package mass.
Hermetic seals can be easily realised.
Process time is short.
Reduced risk of accidental damage to internal components.
Where the fibre has to be realigned, it is done in a simple and non-invasive manner.
The process is easily automated.

Although it is envisaged that the principle application of this invention will be the securing of optical fibre to (ceramic) packages, it would also be possible to employ the present technique to solder or braze glass to metal seals. In this case the seal would act as the tube 12, the glass member would replace the optical fibre and the solder or brazing agent would, as in the case of the already described embodiment, be interposed between the glass member and the seal.

The invention claimed is:

1. A method of securing an optical fibre to an electronic package, comprising: providing in a wall of the package a hollow, electrically and thermally conductive receiving element for receiving the fibre; providing in juxtaposition to the receiving element in one or more metallisation layers of the package an inductance arrangement; providing a fibre-securing agent inside the receiving element; inserting the fibre into the receiving element, applying an RF current to the inductance arrangement and allowing the receiving element and thereby the securing agent to heat up due to the RF current, the securing agent being softened thereby, thereafter allowing the securing agent to cool and harden such that the fibre is secured inside the receiving element.

2. A method according to claim 1 in which the fibre is metallised and the fibre-securing agent is a solder.

3. A method according to claim 2 in which the solder is provided in the form of a wire introduced into a space between the receiving element and the fibre.

4. A method according to claim 2 in which the solder is provided in the form of a tubular preform of solder applied around the metallised fibre prior to insertion of the fibre into the receiving element.

5. A method according to claim 2 in which the solder is provided in the form of rings of solder disposed on the inner and outer surfaces of a metallic wettable tube disposed between the receiving element and the fibre, the solder rings melting during application of a heating current to the inductance arrangement and thereby joining the fibre to the receiving element.

6. A method according to claim 2 in which the solder is provided in the form of a coating of a solder material on the outside of the metallised fibre and on the inside of the receiving element.

7. A method according to claim 6 in which the solder coating is such as to allow a fluxless soldering process to take place.

8. A method according to claim 7 in which the solder coating is a diffusion-type multilayer coating.

9. A method according to claim 1 in which the securing agent is a thermosetting adhesive.

10. A method according claim 1 in which the receiving element is a cylindrical element.

11. A method according to claim 10 in which the receiving element is a tube of ferrous material.

12. A method according claim 1 in which the receiving element is composed of a metallic ink.

13. A method according to claim 12 in which the package is a multilayer package and the receiving element is formed by, in an unfired state of the package: (a) the provision of a stepped series of openings in adjacent layers of the package, the stepped series of openings being such as to form an approximation to a circular cylindrical cavity laying within the package and running substantially parallel to the orientation of the layers of the package, and (b) the application of the metallic ink to the walls of the cavity.

14. A method according to claim 13, in which, when the package is fired, the ink flows such as to form a substantially circular cylindrical receiving element.

15. A method according to claim 1 in which an electrical screen is provided to shield circuitry, which is disposed on the package, from the RF heating current.

16. A method according to claim 15 in which the screen is in the form of a metal clamp used to align the fibre with a circuit component disposed on the package.

17. A method according to claim 15 in which the screen is in the form of metallisation layer provided on the package and at least partially surrounding the circuitry.

18. A method according claim 1 in which the package is a low-temperature cofired ceramic package.

19. Use of an RF induction heating process to secure an optical fibre to an electronic package in accordance with a method according to claim 1.

20. An optical fibre termination arrangement comprising: an electronic package; a hollow, electrically and thermally conductive receiving element for receiving an optical fibre, said receiving element being provided in a wall of the package; a fibre-securing agent provided inside the receiving element; and an inductance arrangement in the form of one or more metallisation layers of the package, said inductance arrangement being provided in juxtaposition to the receiving element for heating the received element and thereby the fibre-securing agent by application of an RF current to the inductance arrangement.

* * * * *